Patented May 18, 1954

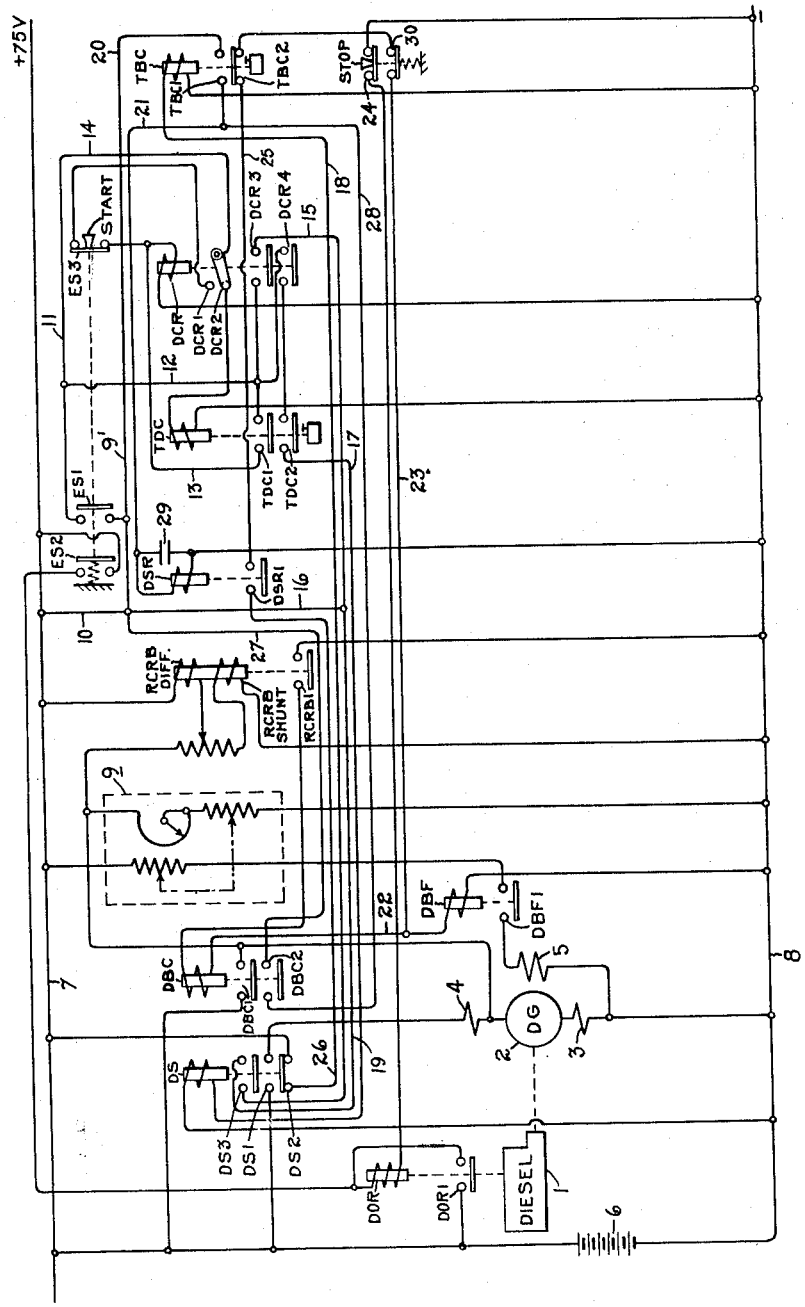

2,679,012

UNITED STATES PATENT OFFICE 2,679,012

STARTING SYSTEM FOR THERMAL PRIME MOVERS

Thurlow J. Warrick, Erie, Pa., assignor to General Electric Company, a corporation of New York Application May 15, 1952, Serial No. 287,885

9 Claims. (Cl. 290—31)

This invention relates to starting systems for thermal prime movers, such as diesel engines, and more specifically to a system for automatically starting such a prime mover.

Thermal prime movers, such as diesel engines, are commonly started by one of two methods; either by injecting compressed air into the cylinders or by cranking the engine with an electric cranking motor. Where the engine is used as a prime mover for an electrically driven vehicle, it is ordinarily mechanically connected to drive a traction generator and it is therefore feasible to utilize this generator as a motor energized from the vehicle batteries to crank the engine. In such a system, it is desirable that the starting of the engine be automatic, i. e. initiated by the closing of a single switch and the various steps of the starting sequence thereafter accomplished automatically. Further, it is desirable that the starting system include certain additional features, for example, automatic breaking of the cranking connection in the event that the engine fails to fire in a predetermined time, and automatic connection of the generator to the battery for charging in the event that the engine did fire and is operating satisfactorily.

It is, therefore, an object of this invention to provide a system for automatically starting a thermal prime mover incorporating the features enumerated above.

Further objects and advantages of this invention will become apparent and the invention will be better understood by reference to the following description and the accompanying drawing, and features of novelty which characterize this invention will be pointed out with particularity in the claims annexed to and forming a part of this specification.

In accordance with this invention, a thermal prime mover, such as a diesel engine, is mechanically connected to drive a generator, the generator in turn being provided with series and shunt field exciting windings. A battery is included in the system and first circuit establishing means are arranged when energized electrically to connect the battery to the generator series field winding for operating the generator as a series motor to crank the prime mover. A first time delay means is provided connected to de-energize the first circuit establishing means after a predetermined time to break the cranking connection. A second circuit establishing means is provided arranged when energized electrically to connect the shunt field winding to the battery for energization and a third circuit establishing means is provided arranged when energized electrically to connect the armature of the generator to the battery for charging. Second time delay means is provided arranged to connect the second circuit establishing means for energization to energize the generator shunt field winding a predetermined time after the deenergization of the first circuit establishing means and means responsive to operation of the prime mover, such as a reverse current relay associated with the generator, is provided and connected to energize the third circuit establishing means to connect the generator armature to the battery. A third time delay means is provided connected to deenergize the second circuit establishing means after a second predetermined time to disconnect the shunt field, however the reverse current relay is connected to render ineffective the third time delay means if the prime mover is operating.

Summarized, the engine is cranked for a predetermined time with the generator being operated as a series motor energized by the battery. In the event that the engine does not fire, the cranking connection is broken after the predetermined cranking period. However, if the engine does fire, it is allowed to idle at no load for a second predetermined time. At the conclusion of this period, the shunt field is energized and if the engine has fired, the generator armature is connected across the battery for charging. However, if the engine has not fired, the armature is not connected to the battery and the shunt field is disconnected.

The single figure of the drawing schematically illustrates the improved prime mover starting system of this invention.

Referring now to the drawing, there is shown a prime mover, such as a diesel engine 1 mechanically connected to drive a generator 2. The generator 2 is provided with a commutating field exciting winding 3, a series field exciting winding 4 and a shunt field exciting winding 5. A battery 6 is provided connected to positive control line 7 and negative control line 8. A voltage regulator 9 is provided and since voltage regulators are well known in the art, it will not be hereinafter more fully described. The remaining components and their functioning can best be described in connection with the description of the operation of the system.

The starting sequence is initiated by the operator manually depressing the start switch thus closing contacts ES-1 and ES-2, and opening contact ES-3. It will be seen that contact ES-1 is connected to the positive supply line 7 through lines 9 and 10 and to the operating coil of time delay relay TDC through lines 11 and 14 with contact DCR2 of relay DCR being interposed in series therewith. The operating coil of relay TDC is, of course, also connected to the negative control line 8. Thus depressing of the start switch closing contact ES-1 picks up relay TDC through normally closed contact DCR2 of relay DCR. It will also be seen that contact ES-1 of the manually operable start switch is connected to the operating coil of relay DCR through lines 11, 12 and 13 with normally open contact TDC1 of relay TDC being interposed in series therewith. Thus, when relay TDC is picked up responsive to closing of start switch contacts ES1, its normally open contact TDC1 will be closed picking up relay DCR. Picking up of relay DCR opens contact DCR2, thus deenergizing the operating coil of relay TDC. Relay TDC has a time delay dropout, for example, 20 seconds, and thus starts to time out. Relay DCR picking up closes contacts DCR1 and and normally open contacts DCR3 and DCR4. Since the start switch is only momentarily depressed, contact ES3 is now closed and the operating coil of the relay DCR, which is, of course, also connected to the negative control line 8, is now connected for energization through the normally closed start switch contact ES3, DCR contact DCR1, line 14, line 11, line 12, DCR normally open interlock contact DCR3, and lines 15, 16 and 10 to the positive control line 7. Relay DCR is thus sealed in through contact ES3 of the start switch, and its interlocks DCR1 and DCR3. The operating coil of relay DS is connected to the negative control line 8 and to line 12 through line 17, normally open contact TDC2 of relay TDC, and normally open contact DCR4 of relay DCR. Since at this instant, relay TDC is still timing out and its contact TDC2 will still be closed, relay DS will be picked up from the positive control line 7 through lines 10, 16, 15, contact DCR3 of relay DCR, contact DCR4 of relay DCR, contact TDC2 of relay TDC and line 17. It will be seen that the operating coil of time delay relay TBC is connected between the negative control line 8 and the positive control line 7 by contact DS3 of relay DS. Thus, when the relay DS is picked up, TBC is also picked up through line 18, contact DS3 of relay DS, and lines 19, 16 and 10. Picking up of time delay relay TBC in turn energizes the operating coil of relay DSR through lines 10, 9' and 20, contact TBC1 of time delay relay TBC, and line 21, the other side of the operating coil of relay DSR being connected to the negative control line 8. It will also be readily seen that the picking up of relay DS closes contact DS1 connecting the series cranking field 4 of the generator 2 to the battery 6 so that the generator is energized as a series motor to crank the diesel 1. Closing of starting switch contact ES2 energizes diesel operating relay DOR to actuate the diesel governor (not shown). This relay seals itself in through its normally open contact DOR-1.

As hereinbefore described, upon manually depressing the starting switch, relays DCR, DS, TBC, DSR, TDC and DOR are picked up and the series field winding 4 of the generator 2 is connected to the battery 6 operating the generator as a series motor for cranking the diesel. Time delay relay TDC was initially picked up but is now deenergized and is timing out. After the requisite time delay, relay TDC drops out and the opening of its contact TDC2 deenergizes relay DS. This in turn opens contact DS1 disconnecting the series cranking field 4 from the battery 6 so that the generator 2 is no longer operated as a motor to crank the diesel. The deenerigzation of relay DS also opens its contact DS3 deenerigizing time delay relay TBC which has a predetermined drop-out time, for example, 10 seconds and thus this relay starts to time out. Dropping out of relay DS also recloses its normally closed contact DS2 in the circuit of the relays DBC and DBF. When relay TBC times out after the predetermined time delay, its normally closed contact TBC2 in the circuit of relays DBC and DBF also closes and its contact TBC1 in the circuit of relay DSR opens. Capacitor 29 is connected across the coil of relay DSR, however, and thus delays the drop-out of relay DSR for a short period, for example, 1 second. Thus, contact DSR1 in the circuit of relays DBC and DBF remains closed momentarily after contacts DS2 and TBC2 have reclosed. Thus, relay DBF picks up closing contact DBF1 connecting the generator shunt field winding 5 to the voltage regulator 9 for energization. If the diesel 1 has fired and is running, the voltage build-up in the armature of the generator 2 will cause the reverse current relay RCRB to pick up. The operating coil of relay DBC is connected to the negative control line 8 with contact RCRB1 of reverse current relay RCRB being arranged in series therewith, the other side of the coil of relay DBC being connected to positive control line 7 through lines 22, 23, normally closed contacts 30 of the stop switch, normally closed contacts TBC2 of relay TBC, line 25, normally open contacts DSR1 of relay DSR, line 26, and normally closed contacts DS2 of relay DS. It will be noted that operating coil of relay DBF is connected across the operating coil of relay DBC and contact RCRB1 of relay RCRB. Picking up of reverse current relay RCRB closes its contact RCRB1 picking up relay DBC. This closes interlock DBC2 of relay DBC sealing in relay DSR, contact DBC2 being connected across contact TBC1 by lines 27 and 28. Picking up of relay DBC also closes its contact DBC1 connecting the armature of generator 2 across the battery 6 for charging. Sealing in of relay DSR through the contact DBC2 insures that contact DSR1 in a circuit of relays DBC and DBF remains closed thus keeping DBC and DBF energized. It will thus be readily seen that relays DSR, DBC, DBF and RCRB are energized with the shunt field winding 5 of generator 2 connected for energization from the voltage regulator 9 and the armature of generator 2 connected to the battery 6 for charging.

In the event that the diesel 1 had not fired, reverse current relay RCRB would not have picked up so its contact RCRB1 would not have closed to pick up relay DBC. Relay DSR would then have dropped out after the time delay caused by the capacitor 29 thus opening the circuit of relay DBF and disconnecting the shunt field winding 5 from the voltage regulator 9 to remove field excitation from the generator 2. It will be seen that under these conditions, the system is entirely shut down and another manual closing of the starting switch is necessary to again attempt to start the system. If, however, the diesel has satisfactorily started and is connected to the battery for charging, it can be stopped by manually depressing the stop switch opening contacts 24 and 30. This opens the circuits of relays DOR, DBC and DBF dropping out these relays, deactuating the diesel governor and disconnecting the shunt field winding 5 from the voltage regulator 9 and the armature of generator 2 from the battery 6. Dropping out of relay DBC and opening of its contact DBC2 will drop out relay DSR to open its contact DSR1 so that relays DBC and DBF remain dropped out after the momentary opening and reclosing of the manually actuated stop switch.

To summarize the operation of this system, momentarily depressing the manually operated start switch picks up time delay relay TDC which in turn picks up relay DCR. Relay DCR seals itself in through its interlock and opens the circuit of time delay relay TDC which starts to time out. With relay DCR picked up and the contacts relay TDC still closed, relay DS will pick up connecting cranking field 4 of the generator 2 to battery 6 to crank the diesel and also energizing time delay relay TBC. When relay TDC times out, contact TDC2 opens the circuit of relay DS thus disconnecting the cranking field 4 from the battery 6 and also initiating the time delay drop-out of relay TBC. Relay DSR was picked up by contact TBC1 of time delay relay TBC and thus its contact DSR1 is closed. Since relay DS was dropped out by the time delay opening of relay TDC, its contact DS2 is closed and when time delay relay TBC times out, contact TBC2 will close, thus picking up relay DBF connecting shunt field winding 5 of generator 2 to the voltage regulator 9. It is thus seen that the diesel is allowed to idle at no load during the duration of the time delay drop-out of relay TBC. If the diesel has fired, closing of the circuit of the shunt field exciting winding by the picking up of relay DBF will energize reverse current relay RCRB closing its contact RCRB1 to energize relay DBC which connects the armature of generator 2 to the battery 6 for charging. Opening of contact TBC1 of time delay relay TBC would normally drop out relay DSR preventing energization of relays DBC and DBF, however, opening of relay DSR is momentarily prevented by capacitor 29 and in the event that reverse current relay RCRB is picked up closing its contact RCRB1 to energize relay DBC, relay DSR is sealed in through interlock contact DBC2 of relay DBC. If the diesel has not fired, or in the event that the generator 2 is not operating satisfactorily, reverse current relay RCRB will not pick up and relay DBC will not be energized, thus allowing relay DSR to drop out opening the circuit of relay DBC and DBF disconnect the shunt field 5 from the voltage regulator 6.

It will now be seen that in accordance with this system, the prime mover is initially cranked for a predetermined period of time using its mechanically connected generator as a series motor energized from the battery. After the predetermined cranking time, the cranking connection is broken and the prime mover is allowed to idle for a second predetermined period after which the shunt field of the generator is energized and in the event that the prime mover has fired, the armature of the generator is connected across the battery for charging. On the other hand, if the prime mover has not fired, the shunt field is disconnected.

It will now be readily apparent that this invention provides an improved starting system for a prime mover, such as a diesel engine, characterized by its automatic progression to the various successive steps after initial manual actuation, and further characterized by the provision of safety features which disconnect the cranking field of the generator from the battery after a predetermined time in order to prevent current drain on the battery and excessive current flow in the generator if the prime mover does not start, and which further disconnects the shunt field connection in the event that the prime mover has not fired or the generator is not producing a predetermined voltage.

While I have shown and described a particular embodiment of this invention, further modifications and improvements will occur to those skilled in the art and I intend in the appended claims to cover all modifications which do not depart from the spirit and scope of this invention.

What I claim as new and desire to secure by Letters Patent of the United States is:

1. A system for starting a thermal prime mover comprising a generator mechanically connected to said main prime mover, a battery, a circuit establishing means arranged when actuated electrically to connect said battery to said generator for operating the same as a motor to crank said prime mover, time delay means connected to deactuate said circuit establishing means after a predetermined time, said time delay means being independent of said generator current, and means responsive to operation of said prime mover arranged electrically to connect said generator to said battery for charging.

2. A system for starting a thermal prime mover comprising a generator mechanically connected to said prime mover, a battery, a first circuit establishing means arranged when actuated electrically to connect said battery to said generator for operating the same as a motor to crank said prime mover, time delay means connected to deactuate said first circuit establishing means after a predetermined time, said time delay means being independent of said generator current, second circuit establishing means arranged when actuated electrically to connect said generator to said battery for charging, and means responsive to operation of said prime mover connected to actuate said second circuit establishing means.

3. A system for starting a thermal prime mover comprising a generator mechanically connected to said prime mover, a battery, a first circuit establishing means arranged when actuated electrically to connect said battery to said generator for operating the same as a motor to crank said prime mover, time delay means connected to deactuate said first circuit establishing means after a predetermined time, said time delay means being independent of said generator current, second circuit establishing means arranged when actuated electrically to connect said generator to said battery for charging, and means responsive to the voltage produced by said generator connected to actuate said second circuit establishing means.

4. A system for starting a thermal prime mover comprising a generator mechanically connected to said prime mover and having a series field exciting winding and a shunt field exciting winding, a battery, a first circuit establishing means arranged when actuated electrically to connect said battery to said series field winding for operating said generator as a motor to crank said prime mover, time delay means connected to deactuate said first circuit establishing means after a predetermined time, a second circuit establishing means arranged when actuated electrically to connect said shunt field winding for energization, a third circuit establishing means arranged when actuated electrically to connect the armature of said generator to said battery for charging, and means responsive to operation of said prime mover connected to actuate said third circuit establishing means.

5. A system for starting a thermal prime mover comprising a generator mechanically connected to said prime mover and having a series field exciting winding and a shunt field exciting winding, a battery, first circuit establishing means arranged when actuated electrically to connect said battery to said series field winding for operating said generator as a motor to crank said prime mover, time delay means connected to deactuate said first circuit establishing means after a predetermined time, a second circuit establishing means arranged when actuated electrically to connect said shunt field winding for energization, a third circuit establishing means arranged when actuated electrically to connect the armature of said generator to said battery for charging, and means responsive to the voltage produced by said generator connected to actuate said third circuit establishing means.

6. A system for starting a thermal prime mover comprising a generator mechanically connected to said prime mover and having a series field exciting winding and a shunt field exciting winding, a battery, a first circuit establishing means arranged when actuated electrically to connect said battery to said series field winding for operating said generator as a motor to crank said prime mover, first time delay means connected to deactuate said first circuit establishing means after a predetermined time, a second circuit establishing means arranged when actuated electrically to connect said shunt field winding for energization, a third circuit establishing means arranged when actuated electrically to connect the armature of said generator to said battery for charging, second time delay means connected to actuate said second circuit establishing means a predetermined time after deactuation of said first circuit establishing means, and means responsive to operation of said prime mover connected to actuate said third circuit establishing means.

7. A system for starting a thermal prime mover comprising a generator mechanically connected to said prime mover and having a series field exciting winding and a shunt field exciting winding, a battery, a first circuit establishing means arranged when actuated electrically to connect said battery to said series field winding for operating said generator as a motor to crank said prime mover, a first time delay means connected to deactuate said first circuit establishing means after a predetermined time, a second circuit establishing means arranged when actuated electrically to connect said shunt field winding for energization, a third circuit establishing means arranged when actuated electrically to connect the armature of said generator to said battery for charging, means responsive to operation of said prime mover connected to actuate said third circuit establishing means, and a second time delay means connected to deactuate said second circuit establishing means after a predetermined time, said prime mover operation responsive means being connected to render ineffective said second time delay means responsive to operation of said prime mover.

8. A system for starting a thermal prime mover comprising a generator mechanically connected to said prime mover and having a series field exciting winding and a shunt field exciting winding, a battery, first circuit establishing means arranged when actuated electrically to connect said battery to said series field winding for operating said generator as a motor to crank said prime mover, time delay means connected to deactuate said first circuit establishing means after a predetermined time, a voltage regulator, a second circuit establishing means arranged when actuated electrically to connect said shunt field winding to said voltage regulator for energization, a third circuit establishing means arranged when actuated electrically to connect the armature of said generator to said battery for charging, and means responsive to operation of said prime mover connected to actuate said third circuit establishing means.

9. A system for starting a thermal prime mover comprising a generator mechanically connected to said prime mover and having a series field exciting winding and a shunt field exciting winding, a battery, first circuit establishing means arranged when actuated electrically to connect said battery to said series field winding for operating said generator as a motor to crank said prime mover, a first time delay means connected to deactuate said first circuit establishing means after a predetermined time, a second circuit establishing means arranged when actuated electrically to connect said shunt field winding for energization, a third circuit establishing means arranged when actuated electrically to connect the armature of said generator to said battery for charging, second time delay means connected to actuate said second circuit establishing means a predetermined time after deactuation of said first circuit establishing means, means responsive to operation of said prime mover connected to actuate said third circuit establishing means, and a third time delay means connected to deactuate said second circuit establishing means after a predetermined time delay, said prime mover operation responsive means being connected to render ineffective said third time delay means responsive to operation of said prime mover.

References Cited in the file of this patent

UNITED STATES PATENTS

| Number | Name | Date |
|---|---|---|
| 1,037,425 | Jepson | Sept. 3, 1912 |
| 1,084,079 | Fynn | Jan. 13, 1914 |
| 1,204,599 | Slough | Nov. 14, 1916 |
| 1,204,600 | Slough | Nov. 14, 1916 |
| 1,475,295 | Getchell | Nov. 27, 1923 |
| 1,738,540 | Replogle et al. | Dec. 10, 1929 |
| 1,869,846 | Frank | Aug. 2, 1932 |
| 2,307,845 | Melcher | Jan. 12, 1943 |
| 2,501,360 | Strong | Mar. 21, 1950 |
| 2,550,414 | Haines | Apr. 24, 1951 |
| 2,579,130 | Swam | Dec. 18, 1951 |
| 2,616,054 | Rady | Oct. 18, 1952 |
| 2,643,346 | Rady | June 23, 1953 |